(12) United States Patent
Brossard

(10) Patent No.: US 10,788,724 B2
(45) Date of Patent: *Sep. 29, 2020

(54) ELECTROCHROMIC DEVICE INCLUDING A TRANSPARENT CONDUCTIVE OXIDE LAYER AND A BUS BAR AND A PROCESS OF FORMING THE SAME

(71) Applicant: SAGE ELECTROCHROMICS, INC., Faribault, MN (US)

(72) Inventor: Sophie Brossard, Paris (FR)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,802

(22) Filed: Jan. 17, 2019

(65) Prior Publication Data
US 2019/0155121 A1 May 23, 2019

Related U.S. Application Data

(63) Continuation of application No. 15/487,133, filed on Apr. 13, 2017, now Pat. No. 10,222,674.
(Continued)

(51) Int. Cl.
*G02F 1/163* (2006.01)
*H01R 25/14* (2006.01)
(Continued)

(52) U.S. Cl.
CPC ............ *G02F 1/163* (2013.01); *G02F 1/1345* (2013.01); *G02F 1/155* (2013.01); *G02F 1/1533* (2013.01);
(Continued)

(58) Field of Classification Search
CPC .......... G02F 1/163; G02F 1/155; G02F 1/153; E06B 2009/2464; E06B 9/24
(Continued)

(56) References Cited

U.S. PATENT DOCUMENTS 5,185,182 A 2/1993 Brown
5,668,663 A * 9/1997 Varaprasad ............ B32B 17/06
359/265
(Continued)

FOREIGN PATENT DOCUMENTS

CN 202953940 U 5/2013
CN 103771724 A 5/2014
(Continued)

OTHER PUBLICATIONS

Standard Test Methods for Assessing the Adhesion of Metallic and Inorganic Coatings by the Mechanized Tape Test, 2010, 6 pgs, ASTM International, West Conshohocken, US.
(Continued)

*Primary Examiner* — Mohammed A Hasan
(74) *Attorney, Agent, or Firm* — Abel Schillinger, LLP; Robert N Young

(57) ABSTRACT

An electrochromic device can include a substrate, a transparent conductive oxide layer over the substrate, and a bus bar over the substrate. The bus bar can include silver and has a resistivity of at most $6.7 \times 10^{-6}$ $\Omega$*cm, an average adhesion strength to $SiO_2$ of at least 3N based on 20 measurements, as determined by Method A of ASTM B905-00 (Reapproved 2010), or a classification of at least 4, as determined by Method B of ASTM B905-00 (Reapproved 2010). In another aspect a process of forming an electrochromic device can include forming a transparent conductive oxide layer over a substrate; forming a bus bar precursor over the substrate, wherein the precursor includes silver; and firing the precursor to form a bus bar. Firing can be performed such that the first bus bar is at a temperature of at least 390° C.

20 Claims, 5 Drawing Sheets

Related U.S. Application Data

(60) Provisional application No. 62/324,496, filed on Apr. 19, 2016.

(51) Int. Cl.

| | | |
|---|---|---|
| *G09G 3/38* | (2006.01) | |
| *G02F 1/153* | (2006.01) | |
| *G02F 1/1345* | (2006.01) | |
| *G02F 1/155* | (2006.01) | |
| *G02F 1/15* | (2019.01) | |
| *B32B 17/10* | (2006.01) | |
| *G02F 1/1523* | (2019.01) | |

(52) U.S. Cl.
CPC ............. *G09G 3/38* (2013.01); *H01R 25/145* (2013.01); *B32B 17/10385* (2013.01); *B32B 17/10513* (2013.01); *G02F 1/15* (2013.01); *G02F 1/1523* (2013.01); *G02F 2001/1536* (2013.01); *G02F 2201/50* (2013.01); *G02F 2201/501* (2013.01); *G02F 2201/508* (2013.01); *H01R 25/14* (2013.01)

(58) Field of Classification Search
USPC .......................................................... 359/275
See application file for complete search history.

(56) References Cited

U.S. PATENT DOCUMENTS

| | | | |
|---|---|---|---|
| 6,094,292 A | 7/2000 | Goldner et al. | |
| 6,118,573 A | 9/2000 | Kubo et al. | |
| 6,472,636 B1 | 10/2002 | Baldwin | |
| 6,492,619 B1 | 12/2002 | Sol | |
| 6,625,875 B2 | 9/2003 | Sol | |
| 7,372,610 B2 | 5/2008 | Burdis et al. | |
| 7,679,810 B2 | 3/2010 | Fuss et al. | |
| 8,094,247 B2 | 1/2012 | Allemand et al. | |
| 8,213,074 B1 | 7/2012 | Shrivastava et al. | |
| 8,585,885 B2 | 11/2013 | Brese et al. | |
| 8,760,749 B2 | 6/2014 | Melcher et al. | |
| 9,090,211 B2 | 7/2015 | McCabe et al. | |
| 9,158,172 B2 | 10/2015 | Sbar et al. | |
| 9,228,092 B2 | 1/2016 | Brese et al. | |
| 9,341,914 B2 | 5/2016 | McCabe et al. | |
| 9,878,670 B2 | 1/2018 | McCabe et al. | |
| 10,222,674 B2 * | 3/2019 | Brossard ................. G02F 1/163 |
| 2002/0024544 A1 | 2/2002 | Codos | |
| 2002/0075552 A1 | 6/2002 | Poll et al. | |
| 2002/0135881 A1 | 9/2002 | Rukavina et al. | |
| 2003/0129416 A1 | 7/2003 | Patz et al. | |
| 2004/0061920 A1 | 4/2004 | Tonar et al. | |
| 2004/0175580 A1 | 9/2004 | Schaepkens | |
| 2005/0195488 A1 | 9/2005 | McCabe et al. | |
| 2006/0283084 A1 | 12/2006 | Johnson | |
| 2007/0133078 A1 | 6/2007 | Fanton et al. | |
| 2008/0169185 A1 | 7/2008 | Burdis et al. | |
| 2009/0181203 A1 | 7/2009 | Valentin et al. | |
| 2009/0197077 A1 | 8/2009 | Reutler et al. | |
| 2010/0067090 A1 | 3/2010 | Egerton et al. | |
| 2010/0245973 A1 | 9/2010 | Wang et al. | |
| 2011/0048614 A1 | 3/2011 | Veerasamy | |
| 2011/0051221 A1 | 3/2011 | Veerasamy | |
| 2011/0059275 A1 | 3/2011 | Stark | |
| 2011/0080629 A1 | 4/2011 | Neuman et al. | |
| 2011/0211246 A1 | 9/2011 | Agrawal et al. | |
| 2012/0026573 A1 | 2/2012 | Collins et al. | |
| 2012/0147449 A1 | 6/2012 | Bhatnagar et al. | |
| 2012/0182593 A1 | 7/2012 | Collins et al. | |
| 2012/0300280 A1 | 11/2012 | Murphy et al. | |
| 2013/0022621 A1 | 1/2013 | Liu et al. | |
| 2013/0271812 A1 | 10/2013 | Brown et al. | |
| 2013/0273377 A1 | 10/2013 | Veerasamy | |
| 2013/0278988 A1 | 10/2013 | Jack et al. | |
| 2013/0286458 A1 | 10/2013 | Lamine et al. | |
| 2013/0288423 A1 | 10/2013 | Takahama | |
| 2014/0043667 A1 * | 2/2014 | Bergh ..................... G02F 1/153 |
| | | | 359/265 |
| 2014/0054578 A1 | 2/2014 | Thoumazet et al. | |
| 2014/0133005 A1 | 5/2014 | Sbar et al. | |
| 2014/0166730 A1 | 6/2014 | Taylor et al. | |
| 2014/0182125 A1 | 7/2014 | Rozbicki et al. | |
| 2014/0338735 A1 | 11/2014 | Allemand et al. | |
| 2015/0072084 A1 | 3/2015 | Mimoun et al. | |
| 2015/0177583 A1 | 6/2015 | Ding et al. | |
| 2015/0362816 A1 | 12/2015 | Strong et al. | |
| 2016/0026055 A1 * | 1/2016 | Choi ..................... B05D 1/005 |
| | | | 156/60 |
| 2016/0229741 A1 | 8/2016 | Canova et al. | |
| 2016/0377948 A1 * | 12/2016 | Rozbicki ................. G02F 1/155 |
| | | | 359/275 |
| 2017/0130523 A1 | 5/2017 | Shrivastava et al. | |
| 2017/0299934 A1 | 10/2017 | Brossard | |
| 2017/0322473 A1 | 11/2017 | Brossard et al. | |
| 2017/0371218 A1 * | 12/2017 | Kailasam ................ G02F 1/153 |
| 2019/0079365 A1 | 3/2019 | Sarrach et al. | |

FOREIGN PATENT DOCUMENTS

| | | |
|---|---|---|
| EP | 0602175 B1 | 9/1992 |
| EP | 2583135 B1 | 6/2011 |
| EP | 2593832 B1 | 5/2013 |
| JP | S59216178 A | 12/1984 |
| JP | H03257829 A | 11/1991 |
| JP | 2014516455 A | 7/2014 |
| JP | 2014519622 A | 8/2014 |
| KR | 20170100568 A | 9/2017 |
| WO | 1993005438 A1 | 3/1993 |
| WO | 201116110 A1 | 12/2011 |
| WO | 2012162502 A1 | 11/2012 |
| WO | 2012177790 A2 | 12/2012 |
| WO | 2013090209 A1 | 6/2013 |
| WO | 2013156721 A1 | 10/2013 |
| WO | 2014078555 A1 | 5/2014 |
| WO | 205055944 A1 | 4/2015 |
| WO | 2015195715 A1 | 12/2015 |
| WO | 2016100403 A1 | 6/2016 |
| WO | 2017184430 A1 | 10/2017 |

OTHER PUBLICATIONS

Chaput, Christophe, "Fabrication of ceramics by stereolithography," Lizenznehmer Rtejoumal—Forum fr Rapid Technologie, 2007, 16 pgs, vol. 4, FR.

International Search Report and Written Opinion for PCT/US2017/027443 dated Sep. 12, 2017, 15 pages.

International Search Report and Written Opinion for PCT/US2016/039346, dated Jul. 31, 2012, 12 pages.

"EL-90038—Highly Conductive Bus Bar Tape for Photovoltaic Applications/EMI Shielding Tape," Adhesives Research, 2013, 4 pgs, US.

International Search Report and Written Opinion for PCT/US2018/049926, dated Dec. 19, 2018, 14 pages.

Non-Final Office Action for U.S. Appl. No. 13/479,781, dated Nov. 20, 2014, 12 pages.

International Search Report and Written Opinion for Application No. PCT/US2013/070129 dated Feb. 21,2014, 11 pages.

Non-Final Office Action for U.S. Appl. No. 13/798,520, dated Oct. 24, 2014, 20 pages.

* cited by examiner

ELECTROCHROMIC DEVICE INCLUDING A TRANSPARENT CONDUCTIVE OXIDE LAYER AND A BUS BAR AND A PROCESS OF FORMING THE SAME

CROSS-REFERENCE TO RELATED APPLICATION

This application is a continuation of and claims priority under 35 U.S.C. 120 to U.S. patent application Ser. No. 15/487,133, filed Apr. 13, 2017, entitled "Electrochromic Device Including a Transparent Conductive Oxide Layer and a Bus Bar and a Process of Forming the Same," naming as an inventor Sophie Brossard, which claims priority under 35 U.S.C. 119(e) to U.S. Provisional Patent Application No. 62/324,496, filed Apr. 19, 2016, entitled "Electrochromic Device Including a Bus Bar Having Low Resistivity and Good Adhesion and a Process of Forming the Same," naming as an inventor Sophie Brossard, of which both applications are assigned to the current assignee hereof and incorporated herein by reference in their entireties.

FIELD OF THE DISCLOSURE

The present disclosure is directed to electrochromic devices, and more specifically to electrochromic devices including transparent conductive layers and bus bars and processes of forming the same.

BACKGROUND

An electrochromic device helps to a room of a building or passenger compartment of a vehicle from becoming too warm. The electrochromic device includes bus bars that can be biased and allow the electrochromic device to change from a higher transmission state to a lower transmission state to reduce the transmission of near infrared radiation. The bus bars are desired to have low resistivity and good adhesion to underlying materials. One or more layers in the electrochromic device may limit the selection of materials and processing conditions for the bus bars. Accordingly, improvement in the resistivity and adhesion of the bus bars is desired.

BRIEF DESCRIPTION OF THE DRAWINGS

Embodiments are illustrated by way of example and are not limited in the accompanying figures.

Figure 1:
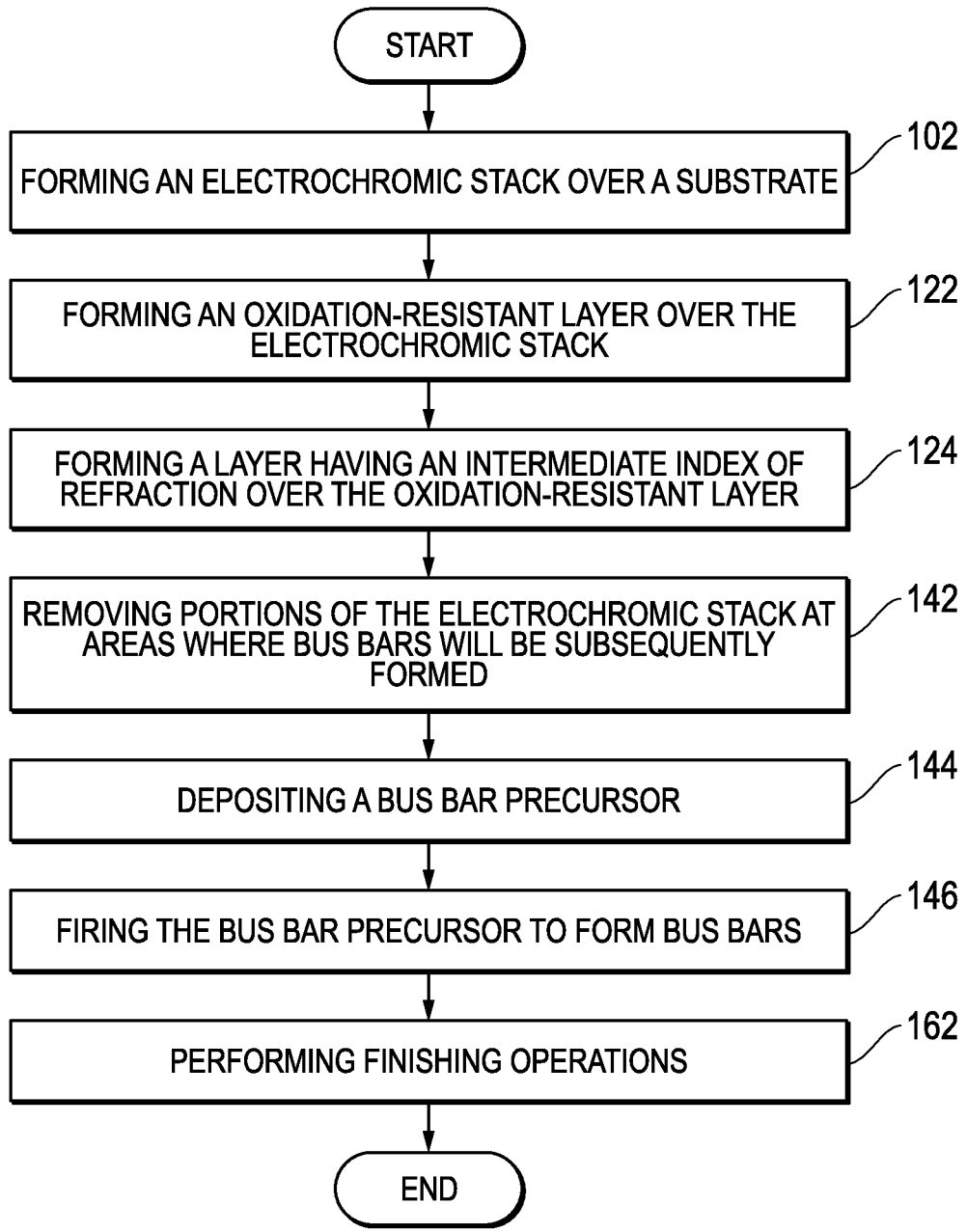
FIG. 1 includes a flow diagram for a process of forming an electrochromic device in accordance with an embodiment as described herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Polymers include homopolymers and co-polymers. A homopolymer is formed from a single polymeric precursor, and a co-polymer is formed from different polymeric precursors.

In this specification, refractive indices are measured at 550 nm.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

An electrochromic device can include a bus bar that has low resistivity and good adhesion to underlying materials, such as a transparent conductive oxide and a substrate, each of which may be in physical contact with the bus bar. The electrochromic device can include a substrate, a transparent conductive oxide layer over the substrate, and a bus bar over the substrate. The bus bar can include silver and have a resistivity of at most $8.0 \times 10^{-6}$ $\Omega$*cm; an average adhesion strength to $SiO_2$ of at least 3 N based on 20 measurements, as determined by Method A of ASTM B905-00 (Reapproved 2010); a classification of at least 3, as determined by Method B of ASTM B905-00 (Reapproved 2010); or any combination thereof.

In another aspect, a process of forming an electrochromic device can include forming a transparent conductive oxide layer over a substrate; forming a bus bar precursor over the substrate, wherein the bus bar precursor includes silver; and firing the bus bar precursor to form a bus bar, wherein firing is performed such that the bus bar is at a temperature of at least 390° C.

An oxidation-resistant layer can be used to reduce the likelihood that a transparent conductive oxide is significantly adversely affected during the formation of the bus bars. The oxidation-resistant layer can allow for silver-based frits to be used that have relatively higher sintering temperatures as compared an electrochromic device formed with the oxidation-resistant layer. In a particular embodiment, the oxidation-resistant layer helps the transparent conductive oxide from becoming too oxidized, which is undesired as the transparent conductive oxide needs to have an acceptable resistivity.

An oxidation-resistant layer may also be used between the substrate and an electrochromic stack. Such an embodiment may be helpful in reducing that mobile ions, such as $Li^+$, $Na^+$, or the like, may migrate from the substrate (e.g., soda lime glass) to the electrochromic stack or from the electrochromic stack to the substrate. In another embodiment, oxidation-resistant layers may lie along opposite major surfaces of the electrochromic stack.

When the oxidation-resistant layer is adjacent to air or another gas, a capping layer can be disposed between the oxidation-resistant layer and air or other gas. The capping layer can have a refractive index that is between the refractive indices of the oxidation-resistant layer and air or the other gas. The capping layer can help in reducing total reflection.

The embodiments as illustrated in the figures and described below help in understanding particular applications for implementing the concepts as described herein. The embodiments are exemplary and not intended to limit the scope of the appended claims.

Figure 2:
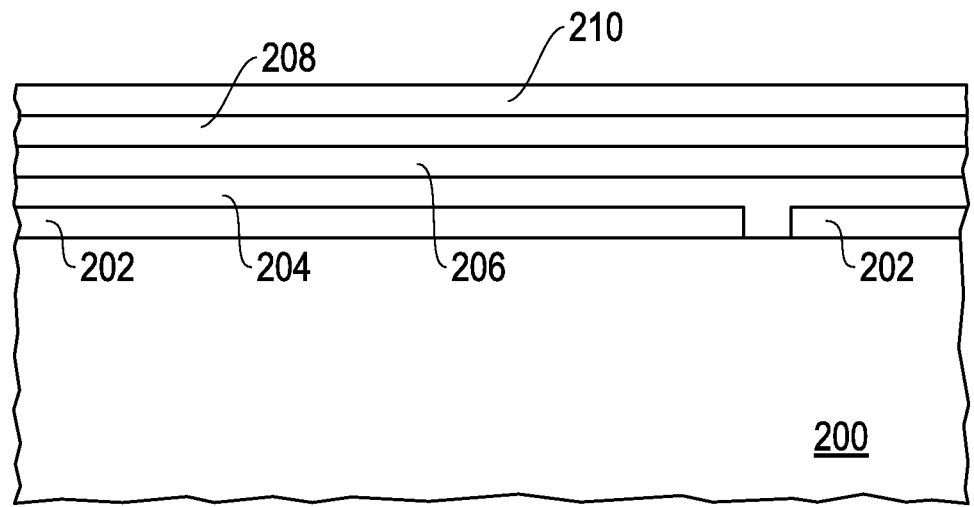
FIG. 2 includes an illustration of a cross-sectional view of a workpiece including a substrate and an electrochromic stack.

FIG. 1 includes a process flow of forming an electrochromic device in accordance with an embodiment. The process can include forming an electrochromic stack over a substrate, at block 102. FIG. 2 includes an illustration of a cross-section view of a partially fabricated electrochromic device after forming an electrochromic stack. The electrochromic device can include a transparent substrate 200 that includes a glass substrate, a sapphire substrate, an aluminum oxynitride (AlON) substrate, a spinel substrate, or a transparent polymer. In a particular embodiment, the transparent substrate 200 can include ultra-thin glass that is a mineral glass having a thickness in a range of 50 microns to 300 microns. The transparent polymer can include a polyacrylate, a polyester, a polycarbonate, a polysiloxane, a polyether, a polyvinyl compound, another suitable class of transparent polymer, or a mixture thereof. In another embodiment, the transparent substrate 200 can be a laminate including layers of the materials that make up the previously described transparent substrates. In another embodiment, the laminate can include a solar control layer that reflects ultraviolet radiation or a low emissivity material. The substrate 200 may or may not be flexible.

In an embodiment, the transparent substrate 200 can be a glass substrate that can be a mineral glass including $SiO_2$ and one or more other oxides. Such other oxides can include $Al_2O_3$, an oxide of an alkali metal, an oxide of an alkaline earth metal, $B_2O_3$, $ZrO_2$, $P_2O_5$, ZnO, $SnO_2$, $SO_3$, $As_2O_3$, or $Sb_2O_3$. The transparent substrate 200 may include a colorant, such as oxides of iron, vanadium, titanium, chromium, manganese, cobalt, nickel, copper, cerium, neodymium, praseodymium, or erbium, or a metal colloid, such as copper, silver, or gold, or those in an elementary or ionic form, such as selenium or sulfur.

In an embodiment in which the transparent substrate 200 is a glass substrate, the glass substrate is at least 50 wt % $SiO_2$. In an embodiment, the $SiO_2$ content is in a range of 50 wt % to 85 wt %. $Al_2O_3$ may help with scratch resistance, for example, when the major surface is along an exposed surface of the laminate being formed. When present, $Al_2O_3$ content can be in a range of 1 wt % to 20 wt %. $B_2O_3$ can be usefully used to reduce both the viscosity of the glass and its thermal expansion coefficient. The $B_2O_3$ content may be no greater than 20 wt %, and in a particular embodiment, less than 15 wt %. Alkaline earth metals include magnesium, calcium, strontium, and barium. The oxides of an alkaline earth metal are useful for reducing the viscosity of the glass and facilitating fusion, without heavily penalizing the expansion coefficient. Calcium and magnesium have a relatively low impact on the density of the glass as compared to some of the other oxides. The total content of alkaline metal oxide may be no greater than 25 wt %, 20 wt %, or 15 wt %. Oxides of an alkali metal can reduce viscosity of the glass substrate and its propensity to devitrify. The total content of alkali metal oxides may be at most than 8 wt. %, 5 wt. %, or 1 wt. %. In some applications, the glass substrate is desired to be clear, and thus, the content of colorants is low. In a particular embodiment, the iron content is less than 200 ppm.

The glass substrate can include heat-strengthened glass, tempered glass, partially heat-strengthened or tempered glass, or annealed glass. "Heat-strengthened glass" and "tempered glass", as those terms are known in the art, are both types of glass that have been heat treated to induce surface compression and to otherwise strengthen the glass. Heat-treated glasses are classified as either fully tempered or heat-strengthened. In an embodiment, the glass substrate is tempered glass and has a surface compression of about 69 MPa or more and an edge compression of about 67 MPa or more. In another embodiment, the transparent substrate is heat-strengthened and has a surface compression in a range of 24 MPa to 69 MPa and an edge compression between 38 MPa and 67 MPa. The term "annealed glass" means glass produced without internal strain imparted by heat treatment and subsequent rapid cooling. Thus annealed glass only excludes heat-strengthened glass or tempered glass. The glass substrate can be laser cut.

A transparent conductive oxide layer 202 overlies the transparent substrate 200. The transparent conductive oxide layer 202 can include doped metal oxide. The doped metal oxide can include a zinc oxide or a tin oxide, either of which may be doped with a Group 13 element, such as Al, Ga, or In. Indium tin oxide (ITO) and aluminum zinc oxide (AZO) are exemplary, non-limiting materials that can be used. As illustrated in FIG. 2, the transparent conductive oxide layer 202 has a cut to allow a subsequently-formed bus bar to contact the right-hand portion of the transparent conductive oxide layer 202 without electrically shorting such bus bar to the left-hand portion of the transparent conductive oxide layer 202. The transparent conductive oxide layer 202 has a thickness in a range of 150 nm to 600 nm.

An electrode layer 204, an electrolyte layer 206, and another electrode layer 208 overlie the transparent conductive oxide layer 202 and the transparent substrate 200. The electrode layer 204 can be one of the electrochromic (EC) layer or the counter electrode (CE) layer, and the electrode layer 208 is the other of the CE layer or the EC layer.

The EC layer can have a variable transmission of visible light and near infrared radiation (e.g., electromagnetic radiation having wavelengths in a range of 700 nm to 2500 nm) depending on the biasing conditions. For example, in the absence of an electrical field, the electrochromic device is in a high transmission ("bleached") state, and an electrical field can cause mobile ions, such as $Li^+$, $Na^+$, or $H^+$, to migrate from the CE layer, through the electrolyte layer to the EC layer and reduce the transmission of visible light and near infrared radiation through the electrochromic device. The lower transmission state may also be referred to as a tinted or colored state. The EC layer can include an oxide of a transition metal, such as iridium, rhodium, ruthenium, tungsten, manganese, cobalt, or the like. In a particular embodiment, the CE layer includes $WO_3$. As initially formed, the EC layer may not include any significant amount of the mobile ions that cause the EC layer to have a reduced transmission. In another embodiment, the EC layer may include at least some mobile ions, however, the electrochromic device may be reverse biased to move the mobile ions from the EC layer, through the electrolyte layer 206 to the CE layer. In an embodiment, the thickness of the EC layer as deposited is in a range 80 nm to 600 nm.

The CE layer can provide a principal source of mobile ions. Furthermore, the CE layer remains substantially transparent to visible light when the electrochromic device is in its high transmission state or its low transmission state. The CE layer can include an oxide of transition metal element. In embodiment, the CE layer can include an oxide of nickel. The nickel may be in its divalent state ($Ni^{2+}$), its trivalent state ($Ni^{3+}$), or a combination thereof. The CE layer can include an oxide of a transition metal element, such as such as iridium, rhodium, ruthenium, tungsten, manganese, cobalt, or the like. The CE layer can also provide the source of mobile ions that can pass through the electrolyte layer 206. The source of mobile ions may be incorporated into the CE layer as it is formed. In a finished device, the CE layer may be represented by a chemical formula of:

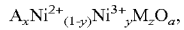

where:
A is an element that produces a mobile ion, such as Li, Na, or H;
M is a metal; and $0 < x \leq 10, 0 \leq y \leq 1, 0 \leq z \leq 10$, and $(0.5x+1+0.5y+z) \leq a \leq (0.5x+1+0.5y+3.5z)$.

In a particular non-limiting embodiment, A is Li, M is W, and, in a finished device, the CE layer may be represented by a chemical formula of:

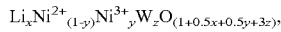

where $1.5 \leq x \leq 3$, $0.4 \leq y \leq 0.95$, and $0.15 \leq z \leq 1$.
In an embodiment, the thickness of the CE layer is in a range 80 nm to 500 nm.

The electrolyte layer 206 includes a solid electrolyte that allows ions to migrate through the electrolyte layer 206 as the electrical field across the electrolyte layer is changed from the high transmission state to the low transmission state, or vice versa. In an embodiment, the electrolyte layer 206 can be a ceramic electrolyte. In another embodiment, the electrolyte layer 206 can include a silicate-based or borate-based material. The electrolyte layer 206 may include a silicate, an aluminum silicate, an aluminum borate, a borate, a zirconium silicate, a niobate, a borosilicate, a phosphosilicate, a nitride, an aluminum fluoride, or another suitable ceramic material. Other suitable ion-conducting materials can be used, such as tantalum pentoxide or a garnet or perovskite material based on a lanthanide-transition metal oxide. In another other embodiment, as formed, the electrolyte layer 206 may include mobile ions. Thus, lithium-doped or lithium-containing compounds of any of the foregoing may be used. The electrolyte layer 206 may include a plurality of layers having alternating or differing materials, including reaction products between at least one pair of neighboring layers. In a further embodiment, the refractive index and thickness of the electrolyte layer 206 are selected to have acceptable visible light transmission while keeping electronic current very low. In another embodiment, the electrolyte layer 206 has low or no significant electronic conductivity (e.g., low leakage current). The thickness of the electrolyte layer 206 can be in a range of 10 nm to 70 nm.

A transparent conductive oxide layer 210 overlies the transparent substrate 200, the transparent conductive oxide layer 202, the electrode layer 204, the electrolyte layer 206, and the electrode layer 208. The transparent conductive oxide layer 210 can include any of the materials as previously described with respect to the transparent conductive oxide layer 202. The transparent conductive oxide layer 210 can include the same material or a different material, as compared to the transparent conductive oxide layer 202. The transparent conductive oxide layer 210 has a thickness in a range of 150 nm to 600 nm.

The layers within the electrochromic stack can be formed by physical vapor deposition, chemical vapor deposition, atomic layer deposition, another suitable technique, or any combination thereof.

The method can further include forming an oxidation-resistant layer over the electrochromic stack, at block 122 in FIG. 1. The oxidation-resistant layer helps to protect underlying layers during a thermal cycle used in annealing or curing subsequently-formed bus bars, heating to bend the substrate 200 to a desired curvature or shape, or another purpose. The performance of one or more of the layers within the electrochromic stack may be adversely affected by the thermal cycle. In a particular embodiment, the transparent conductive oxide layer 202 and 210 may include a transparent conductive oxide that is partially, and not fully, oxidized. If the transparent conductive oxide would become fully oxidized, the transparent conductive oxide may not have sufficient conductivity and may become too resistive or an insulator if fully oxidized. The oxidation-resistant layer helps to protect the transparent conductive oxide layer 202, 210, or both from becoming too oxidized.

Figure 3:
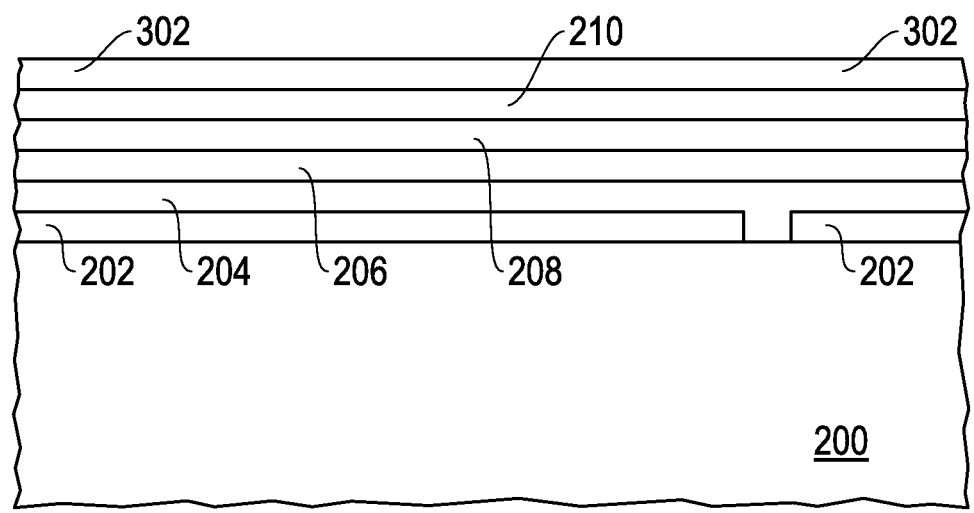
FIG. 3 includes an illustration of a cross-sectional view of the workpiece of FIG. 2 after forming an oxidation-resistant layer.

FIG. 3 includes an illustration of the electrochromic device after forming an oxidation-resistant layer 302 over the transparent conductive oxide layer 210. The oxidation-resistant layer 302 can include a nitride, such as silicon nitride, aluminum nitride, titanium nitride, tungsten nitride, tantalum nitride, titanium silicon nitride, tungsten silicon nitride, tantalum silicon nitride, or another metal nitride. In a particular embodiment, the oxidation-resistant layer 302 includes silicon nitride. The thickness of the oxidation-resistant layer 302 is selected to provide sufficient transmission of visible light. In an embodiment, the thickness of the oxidation-resistant layer is in a range of at least 10 nm to 20 nm in order to provide a continuous layer, and in another embodiment the thickness is at most 300 nm or at most 250 nm, as a greater thickness may cause too much compressive stress that could result in delamination. In a particular embodiment, the compressive stress may be at most 1 GPa. In a particular embodiment, the thickness is in a range of 50 nm to 100 nm to allow a continuous layer with sufficient oxidation resistance to be formed without causing too much stress.

The method can further include forming a layer having an intermediate index of refraction over the oxidation-resistant layer, at block 12 in FIG. 1. The oxidation-resistant layer 302 can have a relatively high index of refraction, and if a major surface of the oxidation-resistant layer 302 would be exposed to air or another gas, the relative difference in the indices of refraction could cause the total reflection to be too high. Thus, the layer having the intermediate index of refraction that is between the indices of refraction of the oxidation-resistant layer and air or another gas can help to reduce total reflection.

Figure 4:
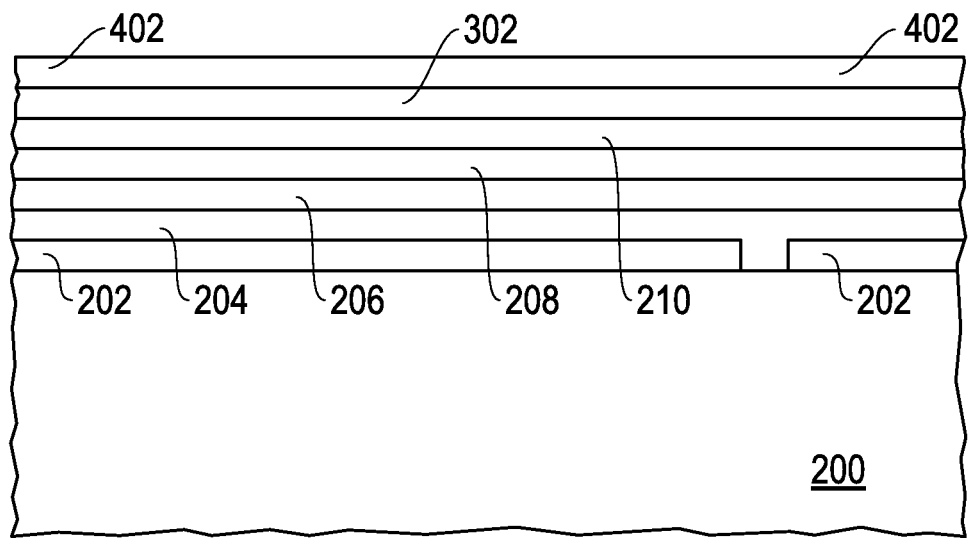
FIG. 4 includes an illustration of a cross-sectional view of the workpiece of FIG. 3 after forming a layer having a refractive index between the refractive indices of the oxidation-resistant layer and an ambient.

FIG. 4 includes an illustration of the electrochromic device after forming a capping layer 402 having an intermediate index of refraction over the oxidation-resistant layer 302. The capping layer 402 can be an insulating layer. In an embodiment, the capping layer 402 can include an oxide, such as a silicon oxide or another suitable oxide. The oxide may or may not be porous. For example, a mixture of the oxide and organic particles can be applied, and the organic particles may be burned off during a subsequent firing, leaving a porous oxide.

The thickness of the layer 402 can be sufficiently thick to affect significantly the total reflection. In practice, sputtering $SiO_2$ is a relatively slow process, thus, an upper value may be limited by equipment throughput. In terms of actual thickness, in a particular embodiment, the capping layer 402 can have a thickness of at least 30 nm, at least 40 nm, or at least 50 nm, and in another particular embodiment, the capping layer 402 can have a thickness of at most 200 nm, at most 150 nm, or at most 150 nm. In terms of ranges, the capping layer 402 may have a thickness in a range of 30 nm to 200 nm, 40 to 150 nm, or 50 nm to 120 nm.

The layers 302 and 402 can be formed by physical vapor deposition, chemical vapor deposition, atomic layer deposition, another suitable technique, or any combination thereof.

Figure 5:
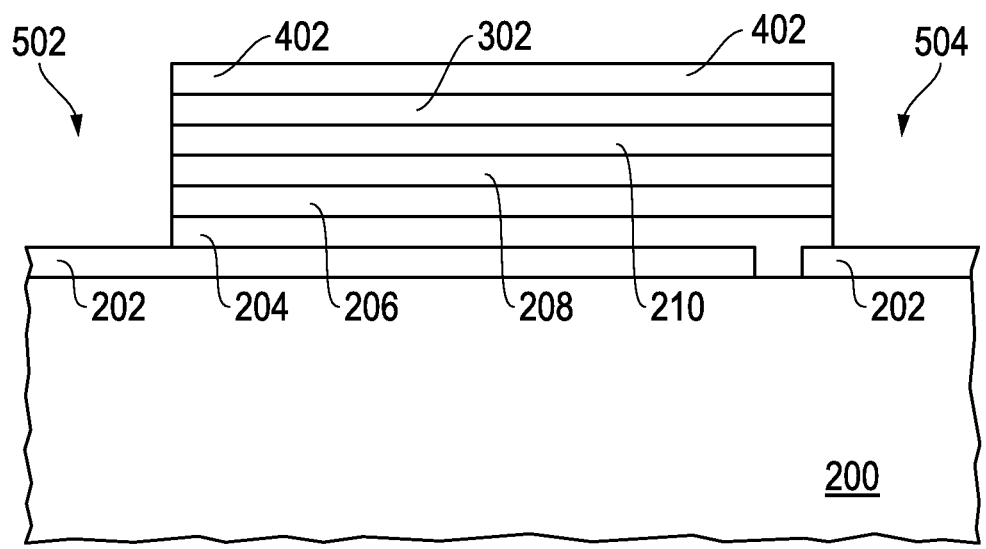
FIG. 5 includes an illustration of a cross-sectional view of the workpiece of FIG. 4 after patterning the electrochromic stack.

The method can include removing portions of the electrochromic stack at areas where bus bars will be subsequently formed, at block 142 of FIG. 1. Referring to FIG. 4, one of the bus bars will be electrically connected to the transparent conductive oxide layer 202 near the left-hand side of FIG. 4, and another bus bar will be electrically connected to the transparent conductive oxide layer 202 near the right-hand side of FIG. 4. The removal of the portions of the electrochromic stack may be performed using an ablating technique, such as laser ablation, or may be removed using an etching technique. As illustrated in FIG. 5, the layers 204, 206, 208, 210, 302, and 402 are patterned to define openings 502 and 504, in which the transparent conductive oxide layer 202 is exposed. In another embodiment, the opening 504 may extend to a different depth as compared to opening 502. For example, the opening 504 may extend to a variety of different depths, so long that the transparent conductive oxide layer 210 is exposed within the opening 504. In an embodiment, the layers 302 and 402 are patterned, and the transparent conductive layer 210 is exposed along the bottom of the opening 504. In another embodiment, the opening 504 can be extended through the transparent conductive oxide layer 202 such that the substrate 200 is exposed along the bottom of the opening 504. After reading this specification, skilled artisans will be able to determine a depth for the opening 504 that meets the needs or desires for a particular application.

The method can further include depositing a bus bar precursor, at block 144 in FIG. 1, and firing the bus bar precursor to form bus bars, at block 146. The bus bar precursor can include silver, and thus, the bus bars can include silver. In an embodiment, the bus bar precursor can be a silver paste. The use of the oxidation-resistant layer 302 allows a greater selection of silver-containing frits to be used and more aggressive firing conditions. For example, silver-containing frits that need a higher firing temperature, a more reactive ambient during firing, or any combination thereof may be used. Before the invention as claimed herein, the selection of silver-containing frits and firing conditions were limited, as the transparent conductive oxide layer 210 would be adversely affected by firing conditions that could cause the transparent conductive oxide layer 210 to become too oxidized. For example, a silver-containing frit may be fired at a temperature at lower than 390° C. in order to not significantly adversely affecting the transparent conductive oxide layer 210. However, firing at such a relatively low temperature provides relative high resistivity and poorer adhesion of the bus bars to the underlying materials that contact the bus bars, such as the transparent conductive oxide layer 202 and the substrate 200 (e.g., a mineral glass material).

The oxidation-resistant layer 302 can help to reduce the likelihood that the transparent conductive oxide layer 210 will be significantly adversely affected by more aggressive firing conditions. Accordingly, a wider variety of silver-containing frits and firing conditions may be used. Firing temperatures of at least 390° C. can be used and provide bus bars having lower resistivity and better adhesion to underlying materials.

Figure 6:
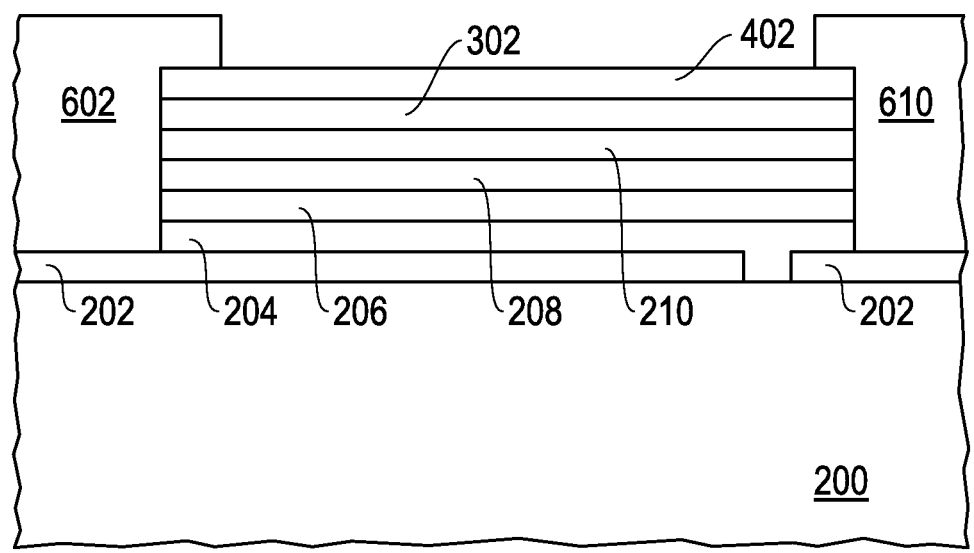
FIG. 6 includes an illustration of a cross-sectional view of the workpiece of FIG. 5 after forming bus bars.

FIG. 6 includes as illustration after forming the bus bars 602 and 610. Some of the deposition and firing parameters can depend on the desired properties of the bus bars 602 and 610 after firing has been performed. The bus bars 602 and 610 can have a resistivity of at most $8.0 \times 10^{-6}$ $\Omega$*cm. In another embodiment, the resistivity is at most $6.0 \times 10^{-6}$ $\Omega$*cm, at most $5.0 \times 10^{-6}$ $\Omega$*cm, at most $4.0 \times 10^{-6}$ $\Omega$*cm, or at most $3.0 \times 10^{-6}$ $\Omega$*cm. Firing temperatures can provide for a lower resistivity. The resistivity will be higher than the resistivity of pure silver as reported in chemistry handbooks, and therefore, the resistivity is greater than $1.59 \times 10^{-8}$ $\Omega$*cm. The thickness of the bus bars 602 and 610, in combination with the resistivity, affect the sheet resistivity. In an embodiment, the thickness of the bus bars 602 and 610 can be at least 2 microns, at least 7 microns, or at least 12 microns. Although a theoretical upper limit in not known, the maximum thickness may depend on the application. In another embodiment, the thickness can be at most 80 microns, at most 60 microns, or at most 40 microns. For many applications, the thickness of the bus bars 602 and 610 are in a range of 12 microns to 40 microns. After reading this specification, skilled artisans will be able to determine a thickness to provide needed or desired electrical properties of the bus bars 602 and 610.

The bus bar precursor can be deposited by printing, silk screening, or the like. The bus bar precursor can have a thickness sufficient to achieve the desired thickness of the bus bars 602 and 610 after the bus bar precursor is fired. The bus bar precursor thickness can depend on the amount of solvent, resin, or other organic or volatile components within the precursor. The bus bar precursor may be deposited to a thickness that is 1.1 times to 4 times the thickness of the bus bars 602 and 610 after firing. As a non-limiting example, if the bus bars 602 to 610 are to have a thickness after firing of 20 microns, the bus bar precursor can be deposited to a thickness in a range of 22 microns to 80 microns.

The bus bar precursor can be fired to form the bus bars 602 and 610. The firing may performed at one or more temperatures. In an embodiment, the substrate 200 can be heated to a temperature in a range of approximately 100° C. to 350° C. to evaporate solvent, burn off resin, volatilize any other organic material, or any combination thereof, if any solvent, resin, or other organic material is within the bus bar precursor. The temperature of the substrate 200 is increased to a sintering temperature to sinter the silver-based frit in the bus bar precursor. The temperature of the substrate 200 can be at least 390° C., at least 400° C., at least 425° C., at least 450° C., or at least 475° C. The resistivity of the bus bars 602 and 610 can be lowered and adhesion to underlying materials can be increased, as higher temperatures can now be used for sintering. The presence of the oxidation-resistant layer 302 during firing helps to reduce the likelihood that the transparent conductive oxide layer 210 will be significantly adversely affected during firing. Thus, a variety of ambients may be used during firing. In an embodiment, the firing can be performed in an inert gas ($N_2$, Ar, or the like) or can include a combination of inert and oxidizing gases ($O_2$, $N_2O$, or the like). In a particular embodiment, the ambient includes air. In another embodiment, the firing may be performed in an oxidizing gas without an inert gas. The time during the sintering portion can be in a range of 2 minutes to 120 minutes. The particular time may depend on the composition of the silver-based frit, and thus, a commercial provider may provide a recommended time range for the sintering portion of firing.

In an embodiment, the firing as previously described may be performed as a separate operation or may occur during a heat cycle performed for another purpose. Thus, the timing of when the firing is performed is flexible, allowing users more latitude in integrating the firing into an existing process flow. Furthermore, the different parts of the firing operation may be performed at different points in a process flow. For example, solvents can be evaporated from the bus bar precursors, resin can be burned off, any other organic material can be volatilized, or any combination thereof can be performed during one heat cycle; and sintering can be performed during a different heat cycle. One or more other process operations may be performed between the different heat cycles, if needed or desired.

Figure 7:
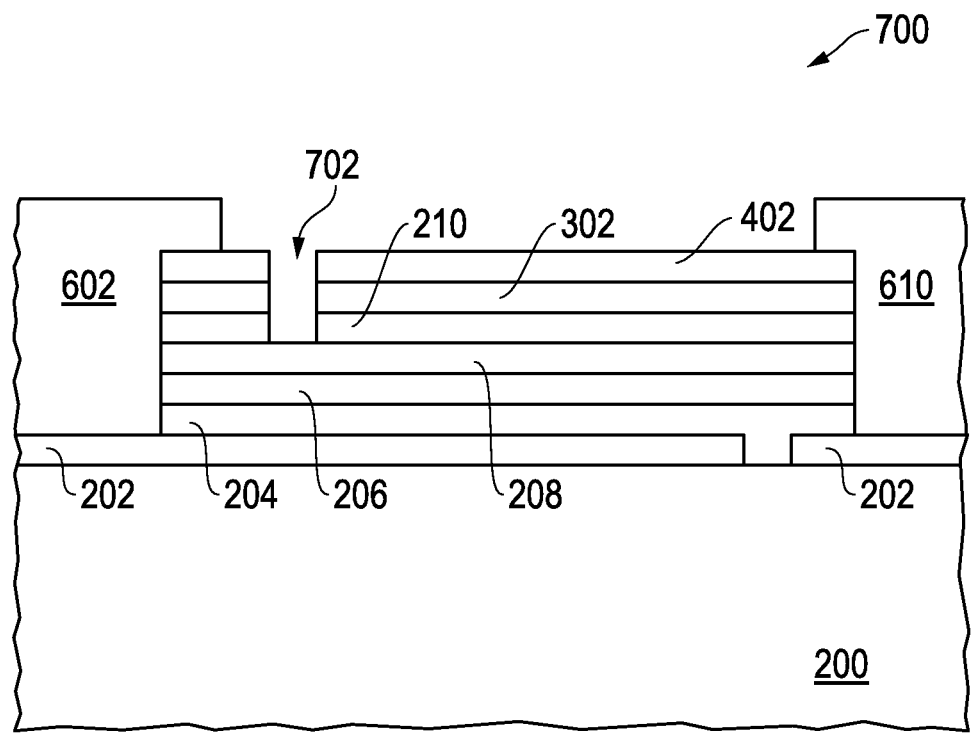
FIG. 7 includes an illustration of a cross-sectional view of the workpiece of FIG. 6 after forming a substantially completed electrochromic device.

The method can further include performing finishing operations, at block 162 in FIG. 1. The particular finishing operation may depend on the particular application. As illustrated in FIG. 7, portions of the layers 210, 302, and 402 are removed at opening 702, so that the bus bar 602 is not electrically connected to most of the transparent conductive oxide layer 210. Thus, the bus bar 602 is a principal connection for the transparent conductive oxide layer 202, and the bus bar 610 is a principal connection for the transparent conductive oxide layer 210. At this point in the process, an electrochromic device 700 is formed. In another embodiment (not illustrated), the bus bar 602 is formed such that it does not contact the side of the stack within the opening 502, as illustrated in FIG. 5. In this embodiment, the removal of the portions of the layers 210, 302, and 402 is not needed.

In a further embodiment, the electrochromic device 700 can be at least a part of a window for a vehicle. In a vehicle application, the electrochromic device 700 may be bent or otherwise shaped to conform to the body shape of the vehicle. The temperature for bending or otherwise shaping the electrochromic device can be in a temperature of at least 600° C. In a particular embodiment, the temperature is in a range of 600° C. to 700° C. The heat may be applied locally. The oxidation-resistant layer 302 can help to reduce the likelihood of significantly adversely affecting the transparent conductive oxide layer 210 during bending or otherwise shaping. The sintering portion of firing to form the bus bars may occur during the heat cycle used to bend the electrochromic device.

Figure 8:
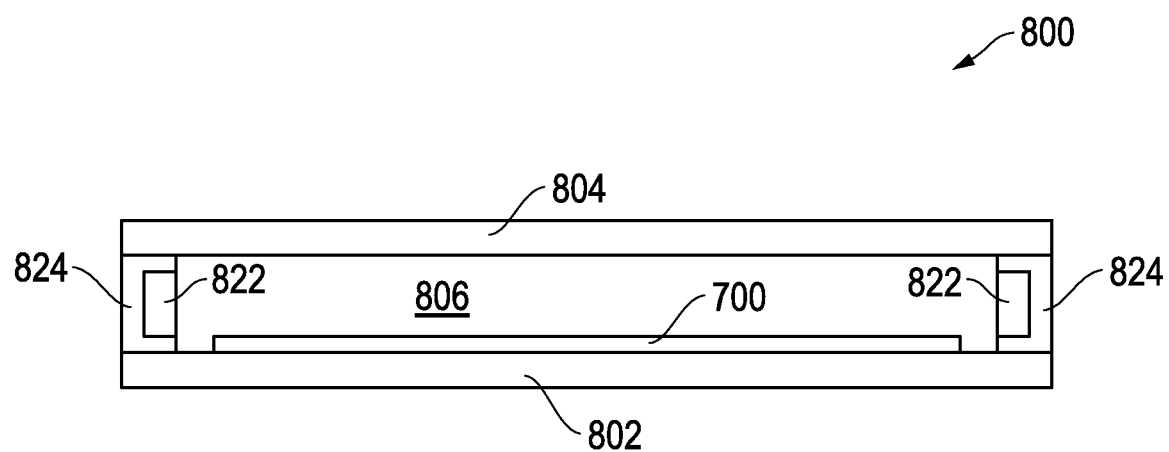
FIG. 8 includes illustration of a cross-sectional view of an insulated glass unit that includes the electrochromic device of FIG. 7.

In an embodiment, an insulated glass unit 800 may be formed, as illustrated in FIG. 8. The electrochromic device 700 can be coupled to a counter substrate 802 that is transparent to visible light. The counter substrate 802 may include a tempered or strengthened glass. In a particular embodiment, an adhesive (not illustrated) can be used between the electrochromic device 700 and the counter substrate 802. The insulated glass unit 800 can further include a glass panel 804, spacers 822, and a sealing material 824. Similar to the counter substrate 802, the glass panel 804 can include a tempered or strengthened glass. Furthermore, the glass panel 804 may be part of a laminate that can include a solar control layer, similar to the solar control layer as previously described with respect to the substrate 200. The insulated glass unit may include a solar control layer within the substrate 200 and not the glass panel 804, a solar control layer within or attached to the glass panel 804, or solar control layer with each of the substrate 200 and within or attached to the glass panel 804 may be used. In this last alternative, the solar control layers may serve different functions. For example, the solar control layer closer to the outside of a building may help to reject near infrared radiation, and the other solar control layer closer to the inside of the building may include a low emissivity material or help to reject ultraviolet radiation. During a sealing operation, an inert gas, such as argon, $N_2$, or the like, may fill the gap 806.

Optionally, after forming the electrochromic device 700, the electrochromic device 700 may be annealed to reduce stress or for another purpose. The anneal may be performed separately from the firing. In another embodiment, the sintering portion of the firing may be combined with the anneal operation. The oxidation-resistant layer 302 can allow a higher temperature for the anneal, an oxidizing ambient, such as air, or both to be used without significantly adversely affecting the transparent conductive oxide layer 210. The anneal may be performed at a temperature in a range of 100° C. to 600° C.

Embodiments can provide benefits as compared to conventional electrochromic devices. The higher temperature during the sintering portion of the firing of the bus bars allows for a wider array of silver-based frits to be used. Before the invention, the temperature during firing would be limited so that the transparent conductive oxide layer 210 would not oxidize too much. As the firing temperature increases, the likelihood of significantly affecting the transparent conductive oxide increases. When an oxidizing ambient is used during firing, the transparent conductive oxide may become too oxidized, and the bus bars will be too resistive. Silver-based frits that do not sufficiently sinter at temperatures of lower than 390° C. can now be used. Such silver-based frits can provide lower resistivity than silver-based frits designed to be sintered at temperatures of less than 390° C., even when the same sintering temperature is used.

The ability to use a higher temperature during the sintering can allow for better adhesion of the bus bars to underlying materials. The bus bars may contact a layer within an electrochromic stack and the substrate. In the embodiment as illustrated, the bus bars 602 and 610 contact the transparent conductive oxide layer 202 and the substrate 200 at an area away from the electrochromic stack. In a particular embodiment, the transparent conductive oxide layer 202 can be a transparent conductive oxide, and the surface of the substrate 200 contacting the bus bars 602 and 610 can be a mineral glass that includes $SiO_2$. ASTM B905-00 (Reapproved) 2010 can be used to test for adhesion to $SiO_2$. In an embodiment using Method A of the ASTM standard, the average adhesion strength to $SiO_2$ is at least 3 N, at least 5 N, or at least 7 N based on 20 measurements. Although there is no theoretical limit of adhesion that would be problematic, the average adhesion strength (Method A) may be less than 1000 N. Very good adhesion strength may be considered at least 15 N. Although there is no theoretical limit of adhesion that would be problematic, the average adhesion strength (Method A) may be less than 1000 N. Very good adhesion strength may be considered at least 15 N. In an embodiment using Method B of the ASTM standard, the average adhesion strength to $SiO_2$ is at least 3 or at least 4 based on 20 measurements.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1

An electrochromic device comprising:
a substrate;
a first transparent conductive oxide layer over the substrate; and
a first bus bar over the substrate, wherein the first bus bar includes silver and has:
 a resistivity of at most $8.0 \times 10^{-6}$ $\Omega$*cm;
 an adhesion strength to $SiO_2$ of at least 3N based on 20 measurements, as determined by Method A of ASTM B905-00 (Reapproved 2010);
 an average adhesion strength to $SiO_2$ of at least 3 based on 20 measurements, as determined by Method B of ASTM B905-00 (Reapproved 2010); or
 a combination thereof.

Embodiment 2

The electrochromic device of Embodiment 1, further comprising an oxidation-resistant layer (1) between the substrate and the first transparent conductive oxide layer or (2) over the first transparent conductive oxide layer.

Embodiment 3

A process of forming an electrochromic device comprising:
forming a first transparent conductive oxide layer over a substrate;
forming a bus bar precursor over the substrate, wherein the bus bar precursor includes silver; and
firing the bus bar precursor to form a first bus bar, wherein firing is performed such that the first bus bar is at a temperature of at least 390° C.

Embodiment 4

The process of Embodiment 3, further comprising forming an oxidation-resistant layer, such that the oxidation-resistant layer is (1) between the substrate and the first transparent conductive oxide layer or (2) over the first transparent conductive oxide layer.

Embodiment 5

The process of Embodiment 3 or 4, wherein forming the oxidation-resistant layer is performed by a sputter deposition technique.

Embodiment 6

The process of any one of Embodiments 3 to 5, wherein firing the bus bar precursor is performed such that the first bus bar is at a temperature of greater than 400° C., at least 425° C., at least 450° C., or at least 475° C.

Embodiment 7

The process of any one of Embodiments 3 to 6, further comprising removing organic material from the bus bar precursor after forming the bus bar precursor over the substrate and before firing the bus bar precursor.

Embodiment 8

The process of Embodiment 7, wherein removing the organic material is performed at a temperature of at most 350° C., at most 325° C., or at most 300° C.

Embodiment 9

The process of any one of Embodiments 2 to 8, wherein firing the bus bar precursor is performed after forming the first transparent conductive oxide layer.

Embodiment 10

The process of any one of Embodiments 2 to 9, further comprising shaping the electrochromic device after firing the bus bar precursor, wherein bending is performed at a temperature of at least 600° C.

Embodiment 11

The electrochromic device or the process of any one of Embodiments 2 and 4 to 9, wherein the oxidation-resistant layer comprises silicon nitride, aluminum nitride, titanium nitride, tungsten nitride, tantalum nitride, titanium silicon nitride, tungsten silicon nitride, or tantalum silicon nitride.

Embodiment 12

The electrochromic device or the process of any one of the preceding Embodiments, wherein the first bus bar has a resistivity of at most $6.0 \times 10^{-6}$ $\Omega$*cm, at most $5.0 \times 10^{-6}$ $\Omega$*cm, at most $4.0 \times 10^{-6}$ $\Omega$*cm, or at most $3.0 \times 10^{-6}$ $\Omega$*cm.

Embodiment 13

The electrochromic device or the process of any one of the preceding Embodiments, wherein the first bus bar has a resistivity greater than $1.59 \times 10^{-8}$ $\Omega$*cm.

Embodiment 14

The electrochromic device or the process of any one of the preceding Embodiments, wherein the first bus bar has an average adhesion strength to $SiO_2$ of at least 3 N, at least 5 N or at least 7N based on 20 measurements as determined by Method A of ASTM B905-00 (Reapproved 2010).

Embodiment 15

The electrochromic device or the process of any one of the preceding Embodiments, wherein the first bus bar has a classification of at least 3 or at least 4 as determined by Method B of ASTM B905-00 (Reapproved 2010).

Embodiment 16

The electrochromic device or the process of any one of the preceding Embodiments, wherein the first bus bar has an average adhesion strength to $SiO_2$ of at most 1000 N based on 20 measurements, as determined by Method A of ASTM B905-00 (Reapproved 2010).

Embodiment 17

The electrochromic device or the process of any one of the preceding Embodiments, wherein the first transparent conductive oxide layer comprises a doped metal oxide.

Embodiment 18

The electrochromic device or the process of any one of the preceding Embodiments, wherein the doped metal oxide comprises a tin oxide doped with a Group 13 element, a zinc oxide doped with a Group 13 element, or any combination thereof.

Embodiment 19

The electrochromic device or the process of any one of the preceding Embodiments, further comprising:
a first electrode that is an electrochromic electrode or a counter electrode;
a second electrode that is the other of the electrochromic electrode or a counter electrode;
a ceramic electrolyte layer disposed between the first electrode and the second electrode; and
a second transparent conductive oxide layer that is closer to the second electrode than to the first electrode,
wherein the first transparent conductive oxide layer is closer to the first electrode than to the second electrode.

Embodiment 20

The electrochromic device or the process of Embodiment 19, further comprising a second bus bar including silver, wherein the first bus bar is electrically connected to the first transparent conductive oxide layer, and the second bus bar is electrically connected to the second transparent conductive oxide layer.

Embodiment 21

The electrochromic device or the process of any one of the preceding Embodiments, further comprising an insulating layer overlying the oxidation-resistant layer, wherein the insulating layer comprises an oxide.

Embodiment 22

The electrochromic device or the process of Embodiment 21, further wherein the insulating layer comprises $SiO_2$.

Embodiment 23

The electrochromic device or the process of any one of the preceding Embodiments, wherein the substrate includes at most 1 wt. % of an alkali metal oxide.

Embodiment 24

The electrochromic device or the process of Embodiment 22, wherein the substrate comprises a mineral glass layer.

Embodiment 25

The electrochromic device or the process of Embodiment 24, wherein the mineral glass layer has a thickness of at most 300 microns.

Embodiment 26

The electrochromic device or the process of any one of the preceding Embodiments, wherein the substrate is flexible.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An electrochromic device comprising:
   a substrate; and
   a first bus bar over the substrate, wherein the first bus bar includes silver and has:
      a resistivity of at most $8.0 \times 10^{-6}$ Ω*cm.

2. The electrochromic device of claim 1, further comprising a first transparent conductive layer over the substrate, an oxidation-resistant layer (1) between the substrate and the first transparent conductive oxide layer or (2) over the first transparent conductive oxide layer.

3. The electrochromic device of claim 2, wherein the oxidation-resistant layer comprises silicon nitride, aluminum nitride, titanium nitride, tungsten nitride, tantalum nitride, titanium silicon nitride, tungsten silicon nitride, or tantalum silicon nitride.

4. The electrochromic device of claim 2, wherein the first transparent conductive oxide layer comprises a doped metal oxide.

5. The electrochromic device of claim 4, wherein the doped metal oxide comprises a tin oxide doped with a Group 13 element, a zinc oxide doped with a Group 13 element, or any combination thereof.

6. The electrochromic device of claim 1, wherein the first bus bar has a resistivity of at most 6.0×10-6 Ω*cm.

7. The electrochromic device of claim 1, wherein the first bus bar has a resistivity of at most 5.0×10-6 Ω*cm.

8. The electrochromic device of claim 1, wherein the first bus bar has a resistivity of at most 4.0×10-6 Ω*cm.

9. The electrochromic device of claim 1, further comprising:
   a first electrode that is an electrochromic electrode or a counter electrode;
   a second electrode that is the other of the electrochromic electrode or a counter electrode;
   a ceramic electrolyte layer disposed between the first electrode and the second electrode; and
   a second transparent conductive oxide layer that is closer to the second electrode than to the first electrode,
   wherein the first transparent conductive oxide layer is closer to the first electrode than to the second electrode.

10. The electrochromic device of claim 2, further comprising an insulating layer overlying the oxidation-resistant layer, wherein the insulating layer comprises an oxide.

11. The electrochromic device of claim 10, further wherein the insulating layer comprises $SiO_2$.

12. An electrochromic device comprising:
    a substrate; and
    a first bus bar over the substrate, wherein the first bus bar includes silver and has:
       an average adhesion strength to $SiO_2$ of at least 3N based on 20 measurements, as determined by Method A of ASTM B905-00 (Reapproved 2010).

13. The electrochromic device of claim 12, wherein the first bus bar has an average adhesion strength to $SiO_2$ of at least 5 N based on 20 measurements as determined by Method A of ASTM B905-00 (Reapproved 2010).

14. The electrochromic device of claim 12, wherein the first bus bar has an average adhesion strength to $SiO_2$ of at least 7 N based on 20 measurements as determined by Method A of ASTM B905-00 (Reapproved 2010).

15. The electrochromic device of claim 12, further comprising a first transparent conductive layer over the substrate, an oxidation-resistant layer (1) between the substrate and the first transparent conductive oxide layer or (2) over the first transparent conductive oxide layer.

16. An electrochromic device comprising: a substrate; and a first bus bar over the substrate, wherein the first bus bar includes silver and has an average adhesion strength to $SiO_2$ of at least 3 based on 20 measurements, as determined by Method B of ASTM B905-00 (Reapproved 2010).

17. The electrochromic device of claim 16, wherein the first bus bar has a classification of at least 4 as determined by Method B of ASTM B905-00 (Reapproved 2010).

18. The electrochromic device of claim 16, further comprising a first transparent conductive layer over the substrate, an oxidation-resistant layer (1) between the substrate and the first transparent conductive oxide layer or (2) over the first transparent conductive oxide layer.

19. The electrochromic device of claim 16, wherein the oxidation-resistant layer comprises silicon nitride, aluminum nitride, titanium nitride, tungsten nitride, tantalum nitride, titanium silicon nitride, tungsten silicon nitride, or tantalum silicon nitride.

20. The electrochromic device of claim 16, wherein the first transparent conductive oxide layer comprises a doped metal oxide.

* * * * *

UNITED STATES PATENT AND TRADEMARK OFFICE
CERTIFICATE OF CORRECTION

Page 1 of 1

PATENT NO. : 10,788,724 B2
APPLICATION NO. : 16/250802
DATED : September 29, 2020
INVENTOR(S) : Sophie Brossard It is certified that error appears in the above-identified patent and that said Letters Patent is hereby corrected as shown below:

On the Title Page

In Column 2, Item (56), Foreign Patent Documents, page 2, Line 16, please delete "WO 205055944 A1" and insert --WO 2015055944--

In the Claims

In Column 16, Line 26-30, please delete:
"An electrochromic device comprising: a substrate; and a first bus bar over the substrate, wherein the first bus bar includes silver and has an average adhesion strength to $SiO_2$ of at least 3 based on 20 measurements, as determined by Method B of ASTM B905-00 (Reapproved 2010)."

And insert:
--An electrochromic device comprising:
    a substrate; and
    a first bus bar over the substrate, wherein the first bus bar includes silver and has
        an average adhesion strength to $SiO_2$ of at least 3 based on 20 measurements, as
determined by Method B of ASTM B905-00 (Reapproved 2010).--

Signed and Sealed this
Twenty-seventh Day of September, 2022

Katherine Kelly Vidal
*Director of the United States Patent and Trademark Office*